May 17, 1938.  B. E. LENEHAN  2,117,894
REMOTE METERING SYSTEM
Filed April 13, 1935  2 Sheets-Sheet 1

WITNESSES:

INVENTOR
Bernard E. Lenehan.
ATTORNEY

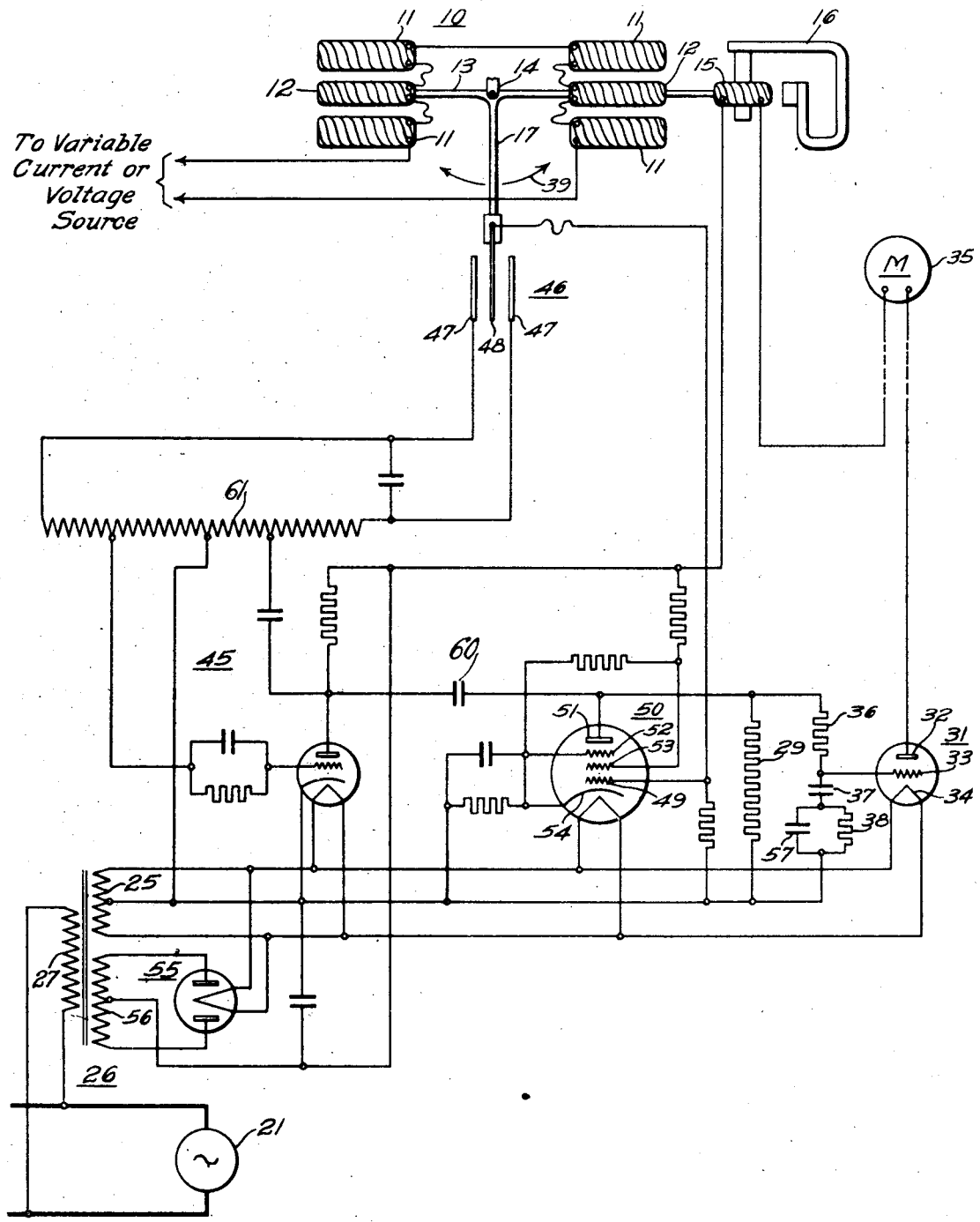

Patented May 17, 1938

2,117,894

UNITED STATES PATENT OFFICE 2,117,894

REMOTE METERING SYSTEM

Bernard E. Lenehan, Bloomfield, N. J., assignor to Westinghouse Electric & Manufacturing Company, East Pittsburgh, Pa., a corporation of Pennsylvania Application April 13, 1935, Serial No. 16,210

14 Claims. (Cl. 171—95)

My invention relates, generally, to electric metering systems and it has particular relation to remote metering systems.

It is desirable to provide remote metering systems which are sensitive to changes in the quantity being measured in order to afford an accurate indication thereof. In the majority of such systems, a balance mechanism is used, together with a restoring mechanism, which is arranged to provide a restoring force proportional to the degree of unbalance caused by changes in the quantity being measured. A meter, arranged to measure this restoring force, may be calibrated in terms of the quantity being measured, so that an indication thereof is afforded. In mechanisms of this type it is well known that there is a tendency to hunt on the occurrence of a change in the quantity being measured. Ordinarily, this tendency is diminished by providing sufficient inertia in the balance mechanism or by providing for damping its movement.

Such provisions for preventing hunting render the system considerably less sensitive to changes in the quantity being measured, and, therefore, the speed of response is considerably reduced. In the design of such systems, it has been necessary to reach a compromise between a system which is sensitive to changes in the quantity being measured and the provision of means for preventing hunting on the occurrence of such changes. As a result, at the remote point where the meter measuring the restoring force is ordinarily located, only an average indication of the quantity being measured is provided. In many instances, this does not afford a sufficiently accurate indication of the quantity being measured for the purposes desired, and, therefore, it is desirable to provide a system which may be constructed to be especially sensitive to changes in the quantity being measured and yet which will be susceptible to a minimum of hunting action.

The object of my invention, generally stated, is to provide a remote metering system which shall be simple, efficient and sensitive in operation and which may be readily and economically manufactured and installed.

An important object of my invention is to provide for reducing hunting in a metering system to a minimum.

Another important object of my invention is to provide an anti-hunting effect in a remote metering system which may be applied substantially instantaneously with the production of the change causing the hunting.

Another object of my invention is to provide an impedance circuit connected to be responsive to an upsetting of a balanced system which is arranged to substantially instantaneously initiate a sequence of functioning for restoring the system to the balanced condition without permitting hunting therein.

Still another object of my invention is to provide for controlling the output of a rectifier in accordance with the movement of a balance mechanism from a balanced position to, in turn, control the conductivity of a space discharge device which is arranged to provide a restoring force for restoring the balance mechanism to the balanced condition.

A still further object of my invention is to provide for utilizing the output of a high-frequency generator, varied in accordance with the movement of a balance mechanism from a balanced condition, to control the application of a restoring force for restoring the balance mechanism to the balanced condition.

Other objects of my invention will, in part, be obvious, and, in part, appear hereinafter.

Accordingly, my invention is disclosed in the embodiment hereof shown in the accompanying drawings comprising the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figure 2 illustrates diagrammatically another form of my invention.

Figure 1:
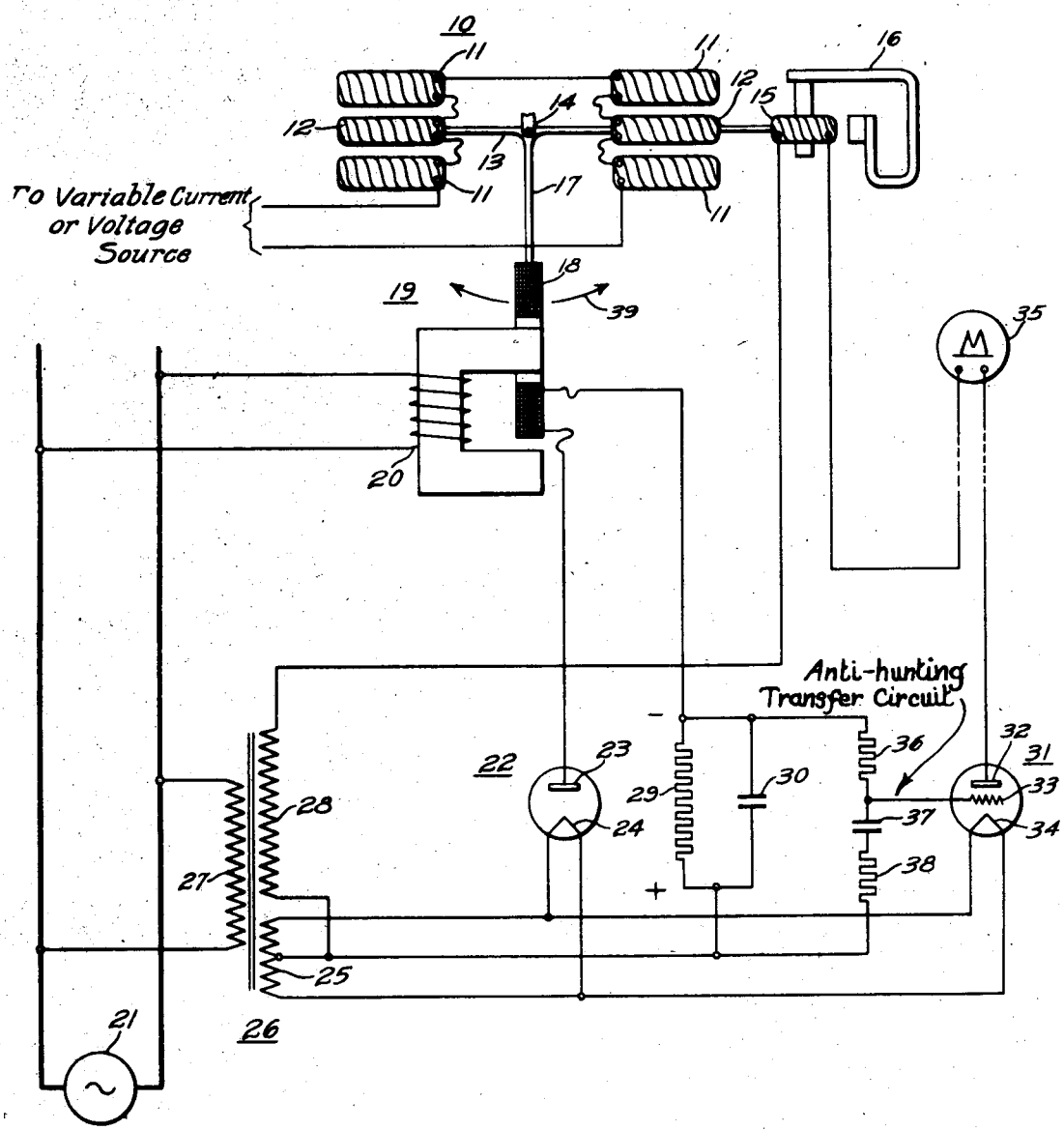
Figure 1 illustrates diagrammatically one form of my invention.

According to my invention, I provide a mechanism, such as a Kelvin balance, for measuring a quantity an indication of which is desired at a remote point. As is customary, the Kelvin balance is provided with a restoring winding connected in series circuit relation with the indicating instrument or meter which may be located at the remote point where the indication of the quantity being measured is desired. It is well known that the force required to restore the Kelvin balance to a balanced position is a measure of the force upsetting the previous balanced condition. Since the restoring force is applied by means of the restoring winding, a measure of the current flowing therethrough will give an indication of the quantity being measured.

In one modification of my invention, I provide a transformer, the primary winding of which may be connected to a source of alternating current and a secondary winding which may be carried by the movable element of the Kelvin balance and is movable therewith. The movement of the secondary winding, in accordance with movements of the Kelvin balance, causes a greater or less voltage to be induced therein, depending upon its position with respect to the primary winding. The output of the secondary winding may be rectified by means of a suitable rectifier and applied, in the form of direct current, to a load circuit. It will thus be apparent that the direct current voltage appearing in the load circuit is a function of the quantity being measured by the Kelvin balance.

In series circuit relation with the restoring winding and indicating meter is connected a space discharge device having the usual anode, cathode and control electrode. A capacitor and a resistor are connected in series circuit relation between the control electrode and the cathode and are also connected to be responsive to voltage changes in the load circuit previously described. It will be apparent that the conductivity of the space discharge device will be regulated in accordance with voltage changes in the load device, and as a result a restoring force may be applied by the restoring winding which is proportional to the force upsetting the balance of the Kelvin balance.

Due, in part, to the inertia of the Kelvin balance, there is the usual tendency for it to overshoot the position at which it will finally be balanced. The restoring force which tends to bring the Kelvin balance back to this position, will be delayed somewhat since its action depends upon the Kelvin balance being moved from a previously balanced position. There is thus a tendency for the Kelvin balance to hunt about the final position which is undesirable.

In order to reduce the hunting to a minimum and to apply the restoring force as quickly as possible, it is desirable that the changes in voltage as applied to the load circuit, be reflected in changes in the current flowing through the restoring winding substantially instantaneously. When the capacitor and resistor circuit is used, as set forth, between the control electrode and the cathode of the space discharge device, such action will take place. This action is due to the fact that, during transient conditions, the voltage change in the capacitor and resistor circuit takes place initially almost entirely in the resistor. This causes instantaneously a corresponding change in the conductivity of the space discharge device and as a result, the current flowing in the restoring winding is correspondingly changed.

In order to provide a more sensitive system, the Kelvin balance may be arranged to utilize the output of a high-frequency generator, such as a Hartley oscillator, and apply it to a powerful amplifier device which is arranged to energize the previously described load circuit with direct current. The changes in voltage appearing in the load circuit, in response to changes in the quantity being measured, are reflected in corresponding changes in conductivity of the space discharge device which is connected in the circuit to the restoring winding and indicating meter.

Referring now particularly to Fig. 1 of the drawings, the reference character 10 designates, generally, a measuring device in the form of a Kelvin balance provided with stationary windings 11 and movable windings 12. As illustrated, the windings 11 and 12 may be connected in series circuit relation and to the current or voltage source, an indication of which is desired. The windings 12 may be mounted on a movable support arm 13 which is fulcrumed at 14. A restoring winding 15 is mounted on an extension of the arm 13 and is disposed to cooperate with a permanent magnet 16.

As illustrated, the Kelvin balance 10 is provided with an arm 17 depending from the support arm 13. The arm 17 is arranged to carry a secondary winding 18 of a transformer shown generally at 19, the primary winding 20 of which may be connected for energization to an alternating current source 21. While a Kelvin balance has been illustrated and described herein as being provided for moving the secondary winding 18, in accordance with changes in the quantity being measured, it will be understood that any other suitable means may be provided for effecting this same movement.

The output of the secondary winding 18 may be rectified by means of a rectifier shown generally at 22, and provided with an anode 23 and a cathode 24. The cathode 24 may be connected for energization to a secondary winding 25 of a transformer, shown generally at 26, having a primary winding 27 connected for energization to the alternating current source 21. The transformer 26 may also be provided with an additional secondary winding 28, the purpose of which will be set forth hereinafter.

The rectifier 22 is arranged to feed a load circuit comprising a resistor 29 and a capacitor 30. It will be understood that the voltage appearing across the load circuit comprising the resistor 29 and the capacitor 30 will depend upon the position of the secondary winding 18, which, in turn, will depend upon the value of the quantity being measured. Thus, the voltage appearing across the load circuit is a function of the quantity being measured.

In order to control the current flowing through the restoring winding 15, a space discharge device 31 is connected in series circuit relation therewith having an anode 32, a grid 33 and a cathode 34. A recording or indicating meter 35, which may be located at a remote point, may also be connected in series circuit relation with the restoring winding 15 and the space discharge device 31 to indicate at the remote point, the value of the quantity being measured. Current for energizing the restoring winding 15 may be obtained from the secondary winding 28.

In order to control the conductivity of the space discharge device 31, a transfer circuit comprising a resistor 36, a capacitor 37 and a resistor 38 is connected across the load circuit comprising the resistor 29 and the capacitor 30. As shown, the capacitor 37 and the resistor 38 are connected in series circuit relation and between the control electrode 33 and the cathode 34.

In operation, assuming that the quantity being measured by the Kelvin balance 10 has increased and that the secondary winding 18 is moved in the direction indicated by the arrow 39, a decrease in the rectified output of the rectifier 22 takes place, since the voltage induced in the secondary winding 18 is reduced. As a result, the voltage across the load circuit comprising the resistor 29 and the capacitor 30 is correspondingly reduced. For an instant, the voltage across the capacitor 37 remains unchanged and the entire change in voltage takes place across the resistor 38. The control electrode 33 suddenly becomes more positive with respect to the cathode 34 and there is a sudden increase in the conductivity of the space discharge device 31. The current flow through the restoring winding 15 is then immediately increased to apply a restoring force to the Kelvin balance 10. With the proper adjustment of the system, it is possible to apply the restoring force substantially instantaneously with the occurrence of an unbalance in the Kelvin balance due to change in the quantity being measured. It will be apparent that, the Kelvin balance 10 may be made very sensitive and slight changes will immediately be indicated by the meter 35.

If the anti-hunting circuit comprising the capacitor 37 and the resistor 38 is not used, the change in flow of current through the restoring winding 15 on change of position of the Kelvin balance 10 may cause hunting in the position of the Kelvin balance. At the instant when a change in the current flowing through the windings of the Kelvin balance takes place, the forces exerted thereby and by the restoring winding are no longer equal. The difference between these forces accelerates the movement of the balance arm 13 in moving to a new balanced position. However, when the balanced position is reached, the balance arm 13 continues to move due to its inertia and thus a hunting action takes place.

When the anti-hunting circuit comprising the capacitor 37 and the resistor 38 is employed, the change in value of the control potential applied to the grid 33 on change in the position of the balance arm 13 takes place slowly due to the effect of the capacitor 37 but the resistor 38 introduces a component of control potential proportional to the capacitor charging current which in turn is proportional to the movement of the balance arm 13 from the balanced position. Hence, the change in control potential is proportional to the velocity or space rate of movement of the balance arm 13. This component of control potential is transient and causes, in turn, a transient force to be set up by the restoring winding 15. Mathematically the transient force and the resulting momentum may be represented by the well known formula: $\int Fdt = MV$. It will thus be apparent that this transient force, exerted by the restoring winding 15, eliminates the effect of momentum, no hunting occurs, and there is no apparent inertia of the balance arm 13.

Referring now particularly to Fig. 2 of the drawings, it will be observed that the Kelvin balance 10 is arranged to control the conductivity of the space discharge device 31 through a somewhat different agency than that illustrated in Fig. 1 and described hereinbefore. In this modification of the invention an oscillator, shown generally at 45, is provided for producing high-frequency oscillations such as at the rate of 10,000 cycles per second. The oscillator 45 illustrated in Fig. 2 of the drawings, is of the conventional Hartley type and since its nature and function are well known, a description thereof will not be set forth in detail herein.

The output of the oscillator 45 is applied to a capacitor 46 comprising fixed plates 47 between which a plate 48 may be moved in accordance with the movement of the Kelvin balance 10. As shown, the plate 48 may be carried by the depending arm 17 in somewhat the same manner as the secondary winding 18 is carried thereby, as illustrated in Fig. 1 of the drawings.

The movable plate 48 may be connected to a control electrode 49 of an amplifier shown generally at 50. The amplifier 50 is of the type which is adapted to provide a high degree of amplification and is further provided with an anode 51, a suppression grid 52, a screen grid 53 and an indirectly heated cathode 54. The plate potential for the amplifier 50, for the oscillator 45 and for the space discharge device 31 may be provided by means of a full-wave rectifier, shown generally at 55, and which may be energized from a secondary winding 56 on the transformer 26.

The output of the amplifier 50 is applied to a load circuit which, in this instance, comprises the previously described resistor 29. The circuit comprising the resistor 36, capacitor 37 and resistor 38 is connected across the load device comprising a resistor 29 in a manner and for the purpose set forth hereinbefore. An additional small capacitor 57 is provided in shunt circuit relation with the resistor 38 in order to filter out the high-frequency oscillations from the oscillator 45, which would otherwise be applied to the control electrode 33.

As illustrated, the amplifier 50 has applied thereto high-frequency oscillations from the oscillator 45 through a capacitor 60. The control electrode 49, which is connected to the movable plate 48 has applied to it an alternating voltage, the magnitude and direction of which vary with the position of the plate 48. If the control electrode 49 and anode 51 are simultaneously positive with respect to their average voltages, the plate voltage is high and a corresponding current flows through the load circuit comprising the resistor 29. If the control electrode 49 is negative when the anode 51 is positive, the current flowing through the load circuit comprising the resistor 29 is of a very low value or of zero value. Stated differently, the oscillations from the oscillation generator 45 are applied across the anode 51 and the cathode 54 of the amplifier 50. The amount of direct current conducted by the amplifier 50 will depend upon the magnitude and phase relation of the potential applied to the control grid 49 relative to the potential applied to the anode 51. These functions are controlled by the relative position of the plate 48 with respect to the plates 47 which, as illustrated, are connected to opposite terminals of the oscillator inductor 61. As a result, in response to slight movements of the movable plate 48, corresponding amplified changes in current flow through the load device comprising the resistor 29 take place. These changes are reflected in changes in the potential of the control electrode 33, as set forth hereinbefore, and the current flow through the restoring winding 15 is correspondingly changed to restore the Kelvin balance 10 to a balanced position. In this embodiment, the capacitor 37 and the resistor 38 function during the transient period to provide the same rapid current change through the space discharge device 31, as previously described.

Since certain further changes may be made in the foregoing construction and different embodiments of the invention may be made without departing from the scope thereof, it is intended that all matter shown in the accompanying drawings and described hereinbefore shall be interpreted as illustrative and not in a limiting sense.

I claim as my invention:

1. A metering system comprising, in combination, balance means disposed to be responsive to variations in a quantity to be measured, thermionic means for applying and measuring the force required to restore said balance means to a balanced condition when changes in said quantity occur thereby providing an indication of said quantity, said thermionic means including a space discharge device having an anode, a cathode and a control electrode, circuit means including reactance and resistance means connected in series circuit relation between said cathode and control electrode, and means for connecting said circuit means to be continuously responsive to a voltage variable in accordance with the movement of said balance means.

2. A metering system comprising, in combination, balance means disposed to be responsive to variations in a quantity to be measured, thermionic means for applying and measuring the force required to restore said balance means to a balanced condition when changes in said quantity occur thereby providing an indication of said quantity, said thermionic means including a space discharge device having an anode, a cathode and a control electrode, a capacitor and a resistor connected in series circuit relation between said cathode and control electrode whereby changes in voltage applied across said series circuit are substantially instantaneously reflected in corresponding changes in the output of said space discharge device, and circuit means for connecting said series circuit to be continuously responsive to a voltage variable in accordance with the movement of said balance means.

3. A metering system comprising, in combination, balance means disposed to be responsive to variations in a quantity to be measured, a restoring winding for restoring said balance means to a balanced condition on departure therefrom, circuit means for connecting said restoring winding to a current source, a space discharge device interposed in said circuit means having an anode, a cathode and a control electrode, circuit means including reactance and resistance means connected in series circuit relation between said cathode and control electrode, and means for connecting said last-named circuit means to be continuously responsive to a voltage variable in accordance with the movement of said balance means.

4. A metering system comprising, in combination, balance means disposed to be responsive to variations in a quantity to be measured, a restoring winding for restoring said balance means to a balanced condition on departure therefrom, circuit means for connecting said restoring winding to a current source, a space discharge device interposed in said circuit means having an anode, a cathode and a control electrode, a capacitor and a resistor connected in series circuit relation between said cathode and control electrode whereby changes in voltage applied across said series circuit are substantially instantaneously reflected in corresponding changes in the output of said space discharge device, and circuit means for connecting said series circuit to be continuously responsive to a voltage variable in accordance with the movement of said balance means.

5. A metering system comprising, in combination, a voltage source, balance means disposed to be responsive to variations in a quantity to be measured for regulating in accordance therewith the voltage obtained from said source, a restoring winding disposed to restore said balance means to a balanced condition on departure therefrom, circuit means for connecting said restoring winding to a current source, a space discharge device interposed in said circuit means having an anode, a cathode and a control electrode, and a capacitor and a resistor connected in series circuit relation between said cathode and control electrode and to be continuously responsive to said regulated voltage whereby changes in said voltage are substantially instantaneously reflected in corresponding changes in the output of said space discharge device to provide an anti-hunting effect in said restoring winding.

6. A metering system comprising, in combination, balance means disposed to be responsive to variations in a quantity to be measured, a restoring winding on the balance means disposed to restore said balance means to a balanced condition on departure therefrom, a meter, a transformer having a primary winding connected to a source of alternating current and a secondary winding movable with respect to said primary winding in accordance with the movement of said balance means, a unidirectional conducting space discharge device and a load circuit connected in series circuit relation with said secondary winding, circuit means for connecting said restoring winding and meter in series to a current source, and space discharge means for controlling the flow of current to said restoring winding and meter in accordance with voltage variations appearing across said load circuit for restoring said balance means to a balanced condition and actuating the meter in accordance with the quantity measured.

7. A metering system comprising, in combination, balance means disposed to be responsive to variations in a quantity to be measured, a restoring winding on the balance means disposed to restore said balance means to a balanced condition on departure therefrom, a meter, a transformer having a primary winding connected to a source of alternating current and a secondary winding movable with respect to said primary winding in accordance with the movement of said balance means, a unidirectional conducting space discharge device and a load circuit comprising a resistor connected in series circuit relation with said secondary winding, circuit means for connecting said restoring winding and meter in series to a current source, and space discharge means interposed in said circuit means and disposed to be responsive to voltage variations appearing across the resistor in said load circuit for correspondingly controlling the current flow through said restoring winding and meter to restore said balance means to a balanced condition and actuate the meter in accordance with the quantity measured.

8. A metering system comprising, in combination, balance means disposed to be responsive to variations in a quantity to be measured, a restoring winding disposed to restore said balance means to a balanced condition on departure therefrom, a transformer having a primary winding connected to a source of alternating current and a secondary winding movable with respect to said primary winding in accordance with the movement of said balance means, a unidirectional conducting space discharge device and a load circuit connected in series circuit relation with said secondary winding, circuit means for connecting said restoring winding to said source of alternating current, a space discharge device interposed in said circuit means having an anode, a cathode and a control electrode, and a capacitor and a resistor connected in series circuit relation between said cathode and control electrode and to be responsive to variations in voltage appearing across said load circuit whereby said voltage variations are substantially instantaneously reflected in corresponding changes in the current flowing through said space discharge device to provide a restoring and anti-hunting effect in said restoring winding.

9. A metering system comprising, in combination, balance means disposed to be responsive to variations in a quantity to be measured, a restoring winding disposed to restore said balance means to a balanced condition on departure therefrom, a source of high frequency current, a capacitor comprising a pair of plates connected to said source of high-frequency current and a plate positioned therebetween and movable in accordance with the movement of said balance means, a space discharge amplifier having an anode and a cathode connected to said source of high-frequency current and a control electrode connected to said movable plate of said capacitor, a load circuit for said amplifier the voltage across which is a function of the conductivity of said amplifier as controlled by the position of said movable plate, circuit means for connecting said restoring winding to a current source, and means for controlling the flow of current to said restoring winding in accordance with voltage variations appearing across said load circuit for restoring said balance means to a balanced condition.

10. A metering system comprising, in combination, balance means disposed to be responsive to variations in a quantity to be measured, a restoring winding disposed to restore said balance means to a balanced condition on departure therefrom, a source of high-frequency current, a capacitor comprising a pair of plates connected to said source of high-frequency current and a plate positioned therebetween and movable in accordance with the movement of said balance means, a space discharge amplifier having an anode and a cathode connected to said source of high-frequency current and a control electrode connected to said movable plate of said capacitor, a load circuit for said amplifier the voltage across which is a function of the conductivity of said amplifier as controlled by the position of said movable plate, circuit means for connecting said restoring winding to a current source, and space discharge means interposed in said circuit means and disposed to be responsive to voltage variations appearing in said load circuit for correspondingly controlling the current flow through said restoring winding to restore said balance means to a balanced condition.

11. A metering system comprising, in combination, balance means disposed to be responsive to variations in a quantity to be measured, a restoring winding disposed to restore said balance means to a balanced condition on departure therefrom, a source of high-frequency current, a capacitor comprising a pair of plates connected to said source of high-frequency current and a plate positioned therebetween and movable in accordance with the movement of said balance means, a space discharge amplifier having an anode and a cathode connected to said source of high frequency current and a control electrode connected to said movable plate of said capacitor, a load circuit for said amplifier the voltage across which is a function of the conductivity of said amplifier as controlled by the position of said movable plate, circuit means for connecting said restoring winding to a current source, a space discharge device interposed in said circuit means having an anode, a cathode and a control electrode, and a capacitor and a resistor connected in series circuit relation between said cathode and control electrode and to be responsive to variations in voltage appearing in said load circuit whereby said voltage variations are substantially instantaneously reflected in corresponding changes in the current flowing through said space discharge device to provide a restoring and anti-hunting effect in said restoring winding.

12. A metering system comprising in combination, balance means disposed to be responsive to variations in a quantity to be measured, said balance means having a direct current balancing element, an energizing circuit for the balancing element, a thermionic device in said energizing circuit for controlling the degree of energization of the balancing element, an energized circuit including a load resistor, means actuated in accordance with the movements of the balance means for continuously controlling the flow of current through the load resistor, and circuit means interposed between the thermionic device and the load resistor for controlling the conductivity of said thermionic device in accordance with the voltage drop across said resistor.

13. A metering system comprising, in combination, balance means disposed to be responsive to variations in a quantity to be measured, said balance means having a balancing element, a meter connected in series circuit relation with the balancing element, a space discharge device having a voltage responsive control element for controlling the energization of the balancing element and meter, a load resistor, a circuit including means for energizing the load resistor with direct current and including means actuated by the balance means for continuously controlling the voltage impressed on said circuit in accordance with the movement of the balance means, and means for connecting the control element of the space discharge device to be responsive to the voltage drop across said load resistor, said means being adapted to effect substantially instantaneous changes in the conductivity of the space discharge device in response to any movement of the balance means.

14. A metering system comprising, in combination, a Kelvin balance disposed to be responsive to variations in a quantity to be measured and having a direct-current balancing element, a source of alternating-current voltage, a load circuit including a rectifier device connected to said source, means actuated by the balance for continually varying the voltage impressed on the load circuit in accordance with the movements of the balance, a circuit connecting the balancing element to said source, a space discharge device connected in said circuit for controlling the flow of current through the balancing element, and circuit means connecting the space discharge device to the load circuit to control the conductivity of said device, whereby the energization of the balancing element is continually controlled in accordance with the voltage impressed upon the load circuit.

BERNARD E. LENEHAN.